(12) United States Patent
Orlamünder et al.

(10) Patent No.: US 6,398,655 B1
(45) Date of Patent: Jun. 4, 2002

(54) TORSIONAL VIBRATION DAMPER WITH MOVABLE MASSES

(75) Inventors: Andreas Orlamünder, Schweinfurt; Bernhard Schierling, Kürnach; Reinhard Feldhaus, Ebenhausen; Jürgen Kleifges, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/597,884

(22) Filed: Jun. 20, 2000

Related U.S. Application Data

(62) Division of application No. 09/100,743, filed on Jun. 19, 1998, now abandoned.

(30) Foreign Application Priority Data

Jun. 21, 1997 (DE) .......................................... 197 26 461

(51) Int. Cl.[7] .................................................. F16D 3/12
(52) U.S. Cl. .......................................... 464/68; 74/574
(58) Field of Search ............................... 464/68, 67, 51, 464/66, 109; 267/273; 475/255, 267; 74/574

(56) References Cited

U.S. PATENT DOCUMENTS 2,082,444 A * 6/1937 Dodge ......................... 475/255
5,735,768 A * 4/1998 Sudau ........................ 464/68 X \* cited by examiner

*Primary Examiner*—Lynne H. Browne
*Assistant Examiner*—Greg Binda
(74) *Attorney, Agent, or Firm*—Cohen, Pontani, Lieberman & Pavane

(57) ABSTRACT

A torsional vibration damper is embodied with a drive-side transmission element and an output-side transmission element, one of which is connected to the gear element of a gear active between the two transmission elements. The gear element is placed into movement during relative movements of the two transmission elements. The gear element is effective as the drive for at least one mass associated with it. Upon a position change of the mass relative to the rotational center of the transmission elements, a change occurs in the moment of inertia caused by the mass. The gear element is connected to the mass by a gear device that transforms its movement and/or changes the translation.

9 Claims, 8 Drawing Sheets

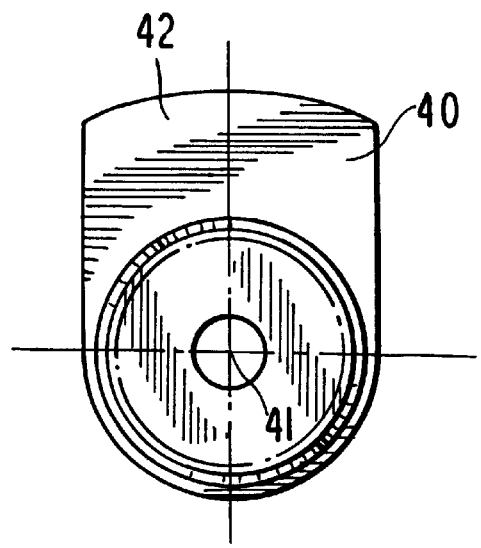
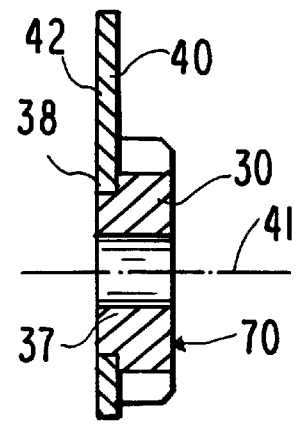
FIG.3a  FIG.3b
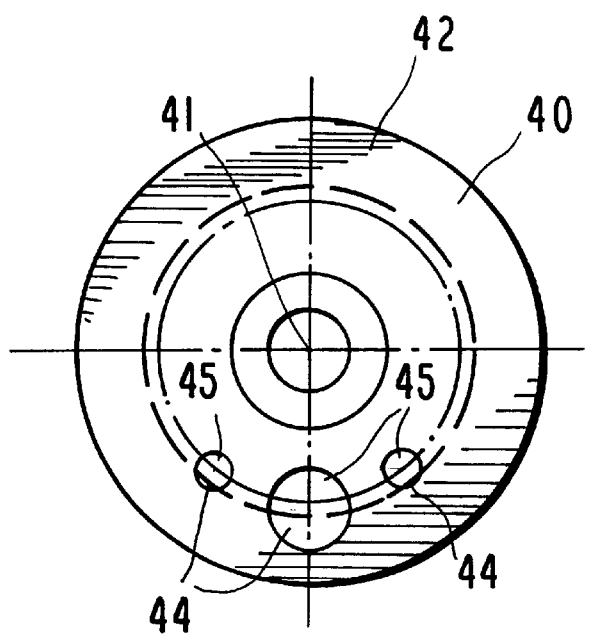
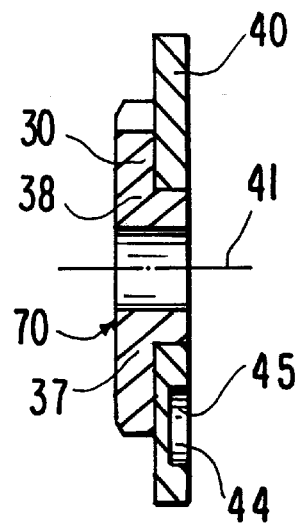
FIG.4a  FIG.4b

TORSIONAL VIBRATION DAMPER WITH MOVABLE MASSES

This application is a Divisional of U.S. patent application Ser. No. 09/100,743, filed Jun. 19, 1998 (abandoned on Nov. 2, 2000).

BACKGROUND OF THE INVENTION

1. Field of the Invention

The invention relates to a torsional vibration damper for a motor vehicle with a drive-side transmission element and an output-side transmission element that are connected via at least two different coupling devices such that momentum flow during vibration damping is divided into first and second predetermined shares.

2. Description of the Related Art

A prior art torsional vibration damper is described in reference DE 44 44 196 A1 that has a first coupling device connected between a drive-side transmission element and an output-side transmission element. The first coupling device is a gear element that acts between the two transmission elements. This gear element, which is placed into motion during relative movements of the two transmission elements, comprises at least one planetary gearwheel of a planetary gear. According to FIG. 2 of the prior art reference, for example, a displacement movement of the drive-side transmission element is conveyed via a sun gear to the planetary gearwheel. The planetary gearwheel divides the conveyed moment into a first moment part, which is transmitted to an internal gear, and a second moment part, which reaches planetary carriers arranged on both sides of the planetary gearwheel and the internal gear. The internal gear and the planetary carriers are connected to each other via a second coupling device in the form of elastic elements running in the circumferential direction. As a result, after deformation of the elastic elements during relative movements of the internal gear and the planetary carriers, the aforementioned partial moments are recombined and conveyed to the output-side transmission element. This method, wherein a conveyed moment is first divided and then recombined is advantageous in that, thanks to the relatively low deformation of the elastic elements running in the circumferential direction, the effect achieved is approximately that of a total mass composed of a drive-side transmission element, an intermediate element and an output-side transmission element. For this reason, the apparent mass inertial moment that counteracts equidirectional fluctuations of the drive is increased, compared with a torsional vibration damper in which larger relative movements between the individual elements are possible. Moreover, low torque fluctuations are attained at the engine front. Of course, this torsional vibration damper has a fixed resonance, so that it does not act as a self-quieting system. Rather, if the torsional vibration damper remains in its resonance range for a relatively long time, damage can result.

Another prior art torsional vibration damper is described in DE 42 00 174 A1 with a drive-side transmission element and an output-side transmission element that are connected to each other via a gear having a link and a pivotable mass. The gear is part of a coupling device. The link acts on one transmission element and the mass acts on the other in articulated fashion. The link is effective as a gear element, which is placed into motion during a relative movement of the two transmission elements, whereby the speed and acceleration of the transmission elements during this relative movement, as well as the size of the movement itself, are decisive for the movement behavior of the gear element. The gear element acts as a drive for the pivotable mass. Displacements of the pivotable mass brought about by the gear element occur counter to the centrifugal force created during the rotation of the torsional vibration damper. In FIG. 1 of this reference, for example, the pivotable mass is embodied as a lever arm rotatable around a rotational point, so that when the mass is displaced from an initial state, its center of gravity is radially moved relative to the rotational center of the torsional vibration damper. As a result, because the distance of the center of gravity from the rotational center is quadratically related to the moment of inertia, the transmission element, during a change in position, must overcome a moment of inertia associated with the position and movement behavior of the pivotable mass. This offers the advantage that, when the transmission elements carry out large movements relative to each other, e.g., during passage through a resonance area or in the event of strong load alternation impacts, the apparent inertial moment of the drive-side transmission element is very high, compared with a torsional vibration damper with a mass with a movable center of gravity. Equidirectional fluctuations of the drive are therefore counteracted, resulting in low torque fluctuations at the engine front. Furthermore, because the movements of the mass continuously change the inertia of the corresponding transmission element, no unambiguous resonance point exists, so that the torsional vibration damper acts as a self-quieting system.

A problem with this torsional vibration damper is that the change in inertia brought about by the pivotable mass, in itself desirable, occurs within narrow limits.

SUMMARY OF THE INVENTION

It is an object of the invention to embody a torsional vibration damper such that, given a movable resonance frequency, the moment of inertia counteracting a load alternation impact changes sharply depending on the displacement conditions of the transmission elements.

This object is attained according to the invention by providing the vibration damper with two coupling devices wherein at least one of the coupling devices has associated with it at least one mass which moves into a different position during a relative movement of the two transmission elements. The movement of the mass changes the moment of inertia of one of the transmission elements relative to the rotational axis of the vibration damper.

By providing the torsional vibration damper with a gear device that transforms the movement of a gear element or changes the translation, the mass can be driven such that the strongest possible change in the moment of inertia is attained upon a movement of the mass. For example, the gear element may comprise a planetary gearwheel of a planetary gear in drive connection with a gearwheel of considerably larger diameter. In this case, for one rotation of the larger gearwheel, a plurality of rotations of the planetary gearwheel are needed. The advantage here is that even in the case of relatively large relative movements between the transmission elements, and a correspondingly large number of rotations of the planetary gearwheels, the large gearwheel executes only one rotation, or even only part of one rotation. Thus, when a change in rotational angle is brought about in this fashion, an eccentrically embodied gearwheel, for example, immediately undergoes a considerable change in its center of gravity relative to the rotational center of the torsional vibration damper.

In the operational mode described above, such a gearwheel moves in an oscillating fashion, so that two exactly defined end positions exist, within which the moment of inertia changes between a maximum value and a minimum value. The connection of the planetary gearwheel to the aforementioned large gearwheel may be established by an interlocking gear tooth connection. However, it is equally possible to create a friction-locking connection. It is also conceivable to drive a mass that, because of the embodiment of the gear device, moves at a higher speed than the planetary gearwheel or gear element of some other type, so that upon each relative movement of the transmission elements, very high acceleration can be applied to the mass to build up the comparatively high movement speed. The inertia counteracting such a procedure is considerable.

Instead of embodying the mass as a rotating object, the mass may also comprise radially movable elements. Due to their radial movement, the center of gravity of these elements moves radially relative to the rotational center of the torsional vibration damper. Therefore, the moment of inertia of the transmission elements is influenced. In addition, embodiments with a pair of radially movable elements are conceivable. In one such embodiment, a certain movement direction of the gear element starting from a normal position, displaces one of the pair of radially movable elements radially inward and displaces the other radially outward. Because the moment of inertia is a quadratic function of the radius of a mass from a center of rotation, the moment of inertia also changes in the event of this movement of radially movable masses. An embodiment is also conceivable in which each radially movable mass is associated with a gear element as a drive. When a plurality of such masses are used, the masses are simultaneously moved radially outward or radially inward. Understandably, the change in the moment of inertia caused by the plurality of masses is considerable. Advantageously, the change in the moment of inertia effected by the change in center of gravity of these masses relative to the rotational center of the torsional vibration damper is supported by a gear element. The gear element distributes the moment applied at one transmission element to the mass, on the one hand, and to the other transmission element or an intermediate element connected thereto, on the other. This measure allows the deformation distance of the springs running in the circumferential direction to be reduced, so that the effect created is approximately that of a total mass composed of a drive-side transmission element, an intermediate element and an output-side transmission element. Accordingly, the apparent mass moment of inertia counteracting the equidirectional fluctuations of the drive is greater than a torsional vibration damper in which larger relative movements between the individual transmission elements are possible.

Depending on the embodiment of the gear, the partial moments produced by the gear element may be independently transmitted to the output-side transmission element. This separation of the moments is known as "branching." In another design, the partial moments are recombined onto the drive-side in closed fashion. This recombination is referred to as "meshing." In the detailed description below, different examples of the invention are discussed, whereby one embodiment includes branching and the other includes meshing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 3a and 3b show an embodiment of a planetary gearwheel for use in the torsional vibration dampers of FIGS. 1 and 2;

FIGS. 4a and 4b show another embodiment of a planetary gearwheel with a mass reduction in the form of a depression;

DETAILED DESCRIPTION OF THE PRESENTLY PREFERRED EMBODIMENTS

Figure 1:
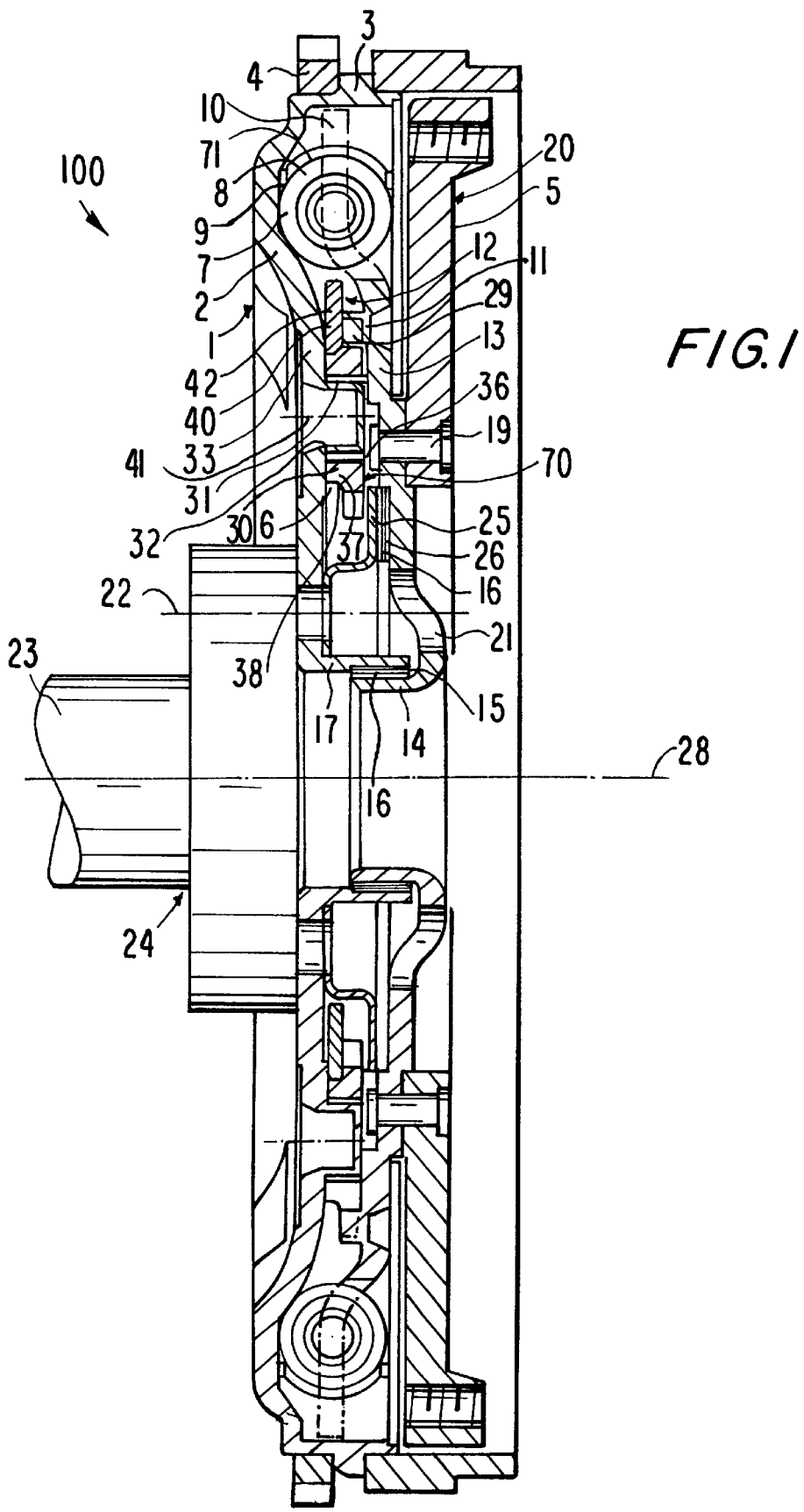
FIG. 1 is a sectional view of a torsional vibration damper according to the invention with drive-side and output-side transmission elements connected to each other via a planetary gear, whereby the planetary gearwheels carry masses that are eccentric relative to their rotational axis.

A torsional vibration damper 100 according to the invention is shown in FIG. 1 having a drive-side transmission element 1 in the form of a centrifugal mass with a radially outwardly directed primary flange 2. An outermost circumferential area of the primary flange 2 has an axial edge 3, onto which a toothed gear rim 4 is placed for engaging a starter pinion (not shown). A sealing plate 5 is attached to the axial edge 3 which extends radially inward. The sealing plate 5, together with the axial edge 3 and the primary flange 2, borders a grease chamber 6.

Elastic elements 7 arranged in the grease chamber 6 run circumferentially in the radially outer area and act as a coupling device 71 for a damping device 8. The elastic elements 7 are compressed between control elements 9 on the primary flange 2 and fingers 10 which project radially outward from a hub disk 13 that is connected to the output-side transmission element 20. The hub disk 13 is connected securely with an internal gear 11 of a planetary gear 12. A radially inner end of the hub disk 13 has a secondary hub 14 for accommodating a radial slide bearing 15 of a bearing 16. A primary hub 17 of the primary flange 2 fits onto the slide bearing 15. From the axial direction, a free end of the primary hub 17 extends from the primary flange 2 toward the hub disk 13 and a free end of the secondary hub 14 extends from the hub disk 13 toward the primary flange 2.

The hub disk 13 is fixedly connected to an output-side transmission element 20, for example, by a riveting 19. The hub disk 13 is also rotatably arranged relative to the drive-side transmission element 1 by the radial slide bearing 15. Adjacent the radially outer side of the radial slide bearing 15, the hub disk 13 includes assembly openings 21 through which attachment means 22 are inserted (attachment means 22 are not shown in FIG. 1 but are indicated by dot-dashed lines through the assembly openings 21). The torsional vibration damper 100 is attached to a crank shaft 23 of a drive 24, such as an internal combustion engine by the attachment means 22.

A ring 25 is held against the primary flange 2 by the attachment means 22. Radially outside of the attachment means 22, an axial slide bearing 26 of the bearing 16 is located axially between the ring 25 and the hub disk 13. During operation a prestress force provided in the direction of the axial slide bearing 26 by a friction clutch prevents an axial detachment of the hub disk 13, and thus of the output-side transmission element 20, from the drive-side transmission element 1. The friction clutch is embodied in the usual manner and therefore not shown. The prestress force is provided by a pressure spring of the friction clutch, which is attached to the output-side transmission element 20, and/or by a disengagement device in the form of a preload.

The internal gear 11 is arranged radially inside from the finger 10 of the hub disk 13. The internal gear 11 has an interlocking gear tooth engagement 29 with a planetary gearwheel 30. The planetary gearwheel 30 is rotatably arranged via a bearing 31 on an axial projection 32 that acts as a bearing journal in the primary flange 2. The primary flange 2 therefore acts as a planetary carrier 33 of the planetary gear 12. The planetary gear 12 serves as a coupling device 70 between the transmission elements 1 and 20 and includes at least one planetary gearwheel 30 is provided as a gear element 36. Relative displacement of the transmission elements 1 and 20 causes a corresponding movement of the gear element 36 (the gear element comprises the planetary gearwheel in this embodiment but may include other types of elements which will be discussed hereafter).

Referring now to FIGS. 3a to 5b, each planetary gearwheel 30 has a shoulder 37 on a ring-shaped area 38 on which carries a mass 40. The mass 40 is attached to the shoulder 37 by welding in the connection area. The mass 40 is eccentric relative to a rotational axis 41 of the planetary gearwheel 30. Many different embodiments of the mass 40 are conceivable.

Figure 5B:
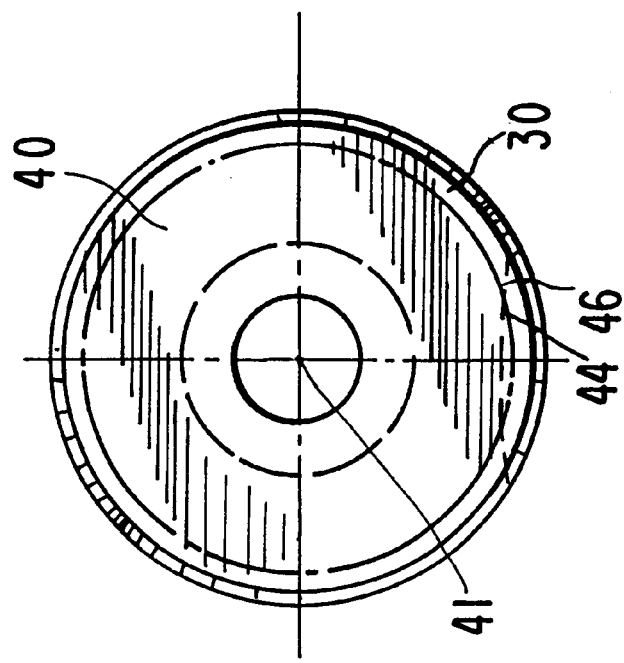
FIGS. 5a and 5b show another embodiment of a planetary gearwheel but with a mass reduction in the form of a circumferential reduction.
Figure 5A:
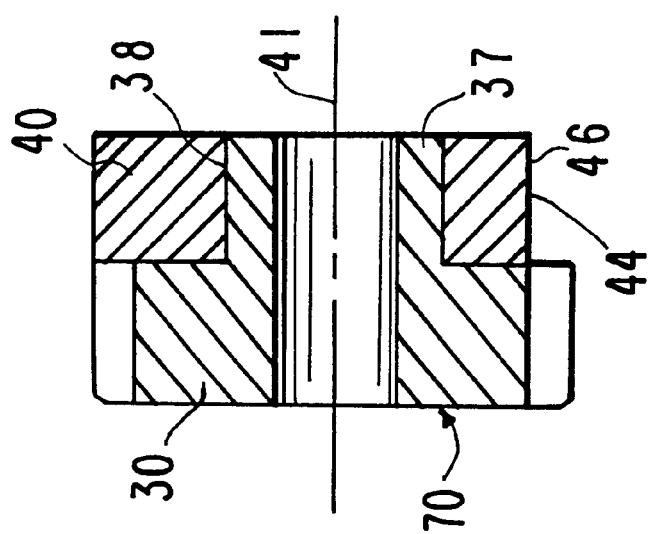

For example, in FIGS. 1, 3a, and 3b, the eccentricity of the mass 40 is created by a mass accumulation 42, which is constituted by a radial excess length of the mass 40 relative to the subordinated planetary gearwheel 30. The lower portion of FIG. 1 shows the mass accumulation 42 in its radially inner end position, while the upper portion of FIG. 1 shows the mass accumulation 42 in a radially outer end position. This will be discussed in detail in the functional description that follows. FIGS. 4a through 5b show a mass reduction 44 on the mass 40. The mass reduction in FIGS. 4a and 4b is attained by depressions 45 in the mass 40. The mass reduction in FIGS. 5a and 5b is attained by a flattened portion 46.

The torsional vibration damper 100 functions as follows: When torsional vibrations are introduced onto the drive-side transmission element 1, the control elements 9 cause a deformation of the elastic elements 7. The deformation of the elastic elements 7 ensures a rotational displacement of the drive-side transmission element 1 relative to the internal gear 11 and thus to the hub disk 13 which are connected to the output side transmission element 20. The rotational displacement of the internal gear 11 drives the planetary gearwheel 30 with the mass 40 connected in rotation-proof fashion thereto around the rotational axis 41.

To dampen as effectively as possible the torsional vibrations initiated by the crank shaft 23, an attempt is made to counteract these torsional vibrations with the highest possible dynamic resistance. To this end, the mass 40 is arranged with a very high moment of inertia so that considerable torque is required to cause and acceleration of the mass 40. This moment of inertia changes by changing the position of the eccentricity of the mass 40 relative to the rotational axis 41 of the planetary gearwheel 30. When there is no relative displacement of the transmission elements 1, 20, the planetary gearwheel 30 and thus the mass 40 assume the end position shown in the lower half of FIG. 1, i.e., the mass accumulation 42 projects radially inward. Upon introduction of a torsional vibration onto the drive-side transmission element 1, the latter is displaced and, in the manner discussed above, transmits a moment to the output-side transmission element 20, as a result of which the planetary gearwheel 30 is rotated. The translation from the internal gear 11 to the planetary gearwheel 30 is preferably selected such that the maximum relative displacement of the transmission elements 1, 20 corresponds to a movement of the planetary gearwheel 30 and thus the mass 40 to an end position shown in the top half of FIG. 1, in which the mass accumulation 42 projects radially outward.

To assign a certain relation to each position between these two extreme positions of the transmission elements 1 and 20, on the one hand, and the planetary gearwheel 30, on the other, the aforementioned translation of movement between the internal gear 11 and the planetary gearwheel 30 should be selected in such a way that the planetary gearwheel 30 executes a movement of only 180°. Because the radius of a mass about an axis of rotation is related quadratically to the moment of inertia, the change in position of the mass accumulation 42 relative to the rotational center 28 caused by the rotation of the planetary gearwheel 30 changes the moment of inertia of the vibration damper 100, in particular, that of the drive-side transmission element 1. The moment of inertia is minimal in the position shown in the lower half of FIG. 1 and maximum in the position shown in the upper half.

It should also be noted that moments conveyed via the drive-side transmission element 1 to the elastic elements 7 as well as to the hub disk 13 are divided at the planetary gearwheel 30. A first partial moment is conveyed via the hub disk 13, which acts on the internal gear 11, to the output-side transmission element 20, while a second partial moment is conveyed via the primary flange 2 to the output-side transmission element 20 via the elastic elements 7. The independent transmission of the partial moments to the output-side transmission element, as in the embodiment of the torsional vibration damper 100 in FIG. 1, is referred to as "branching".

Figure 2:
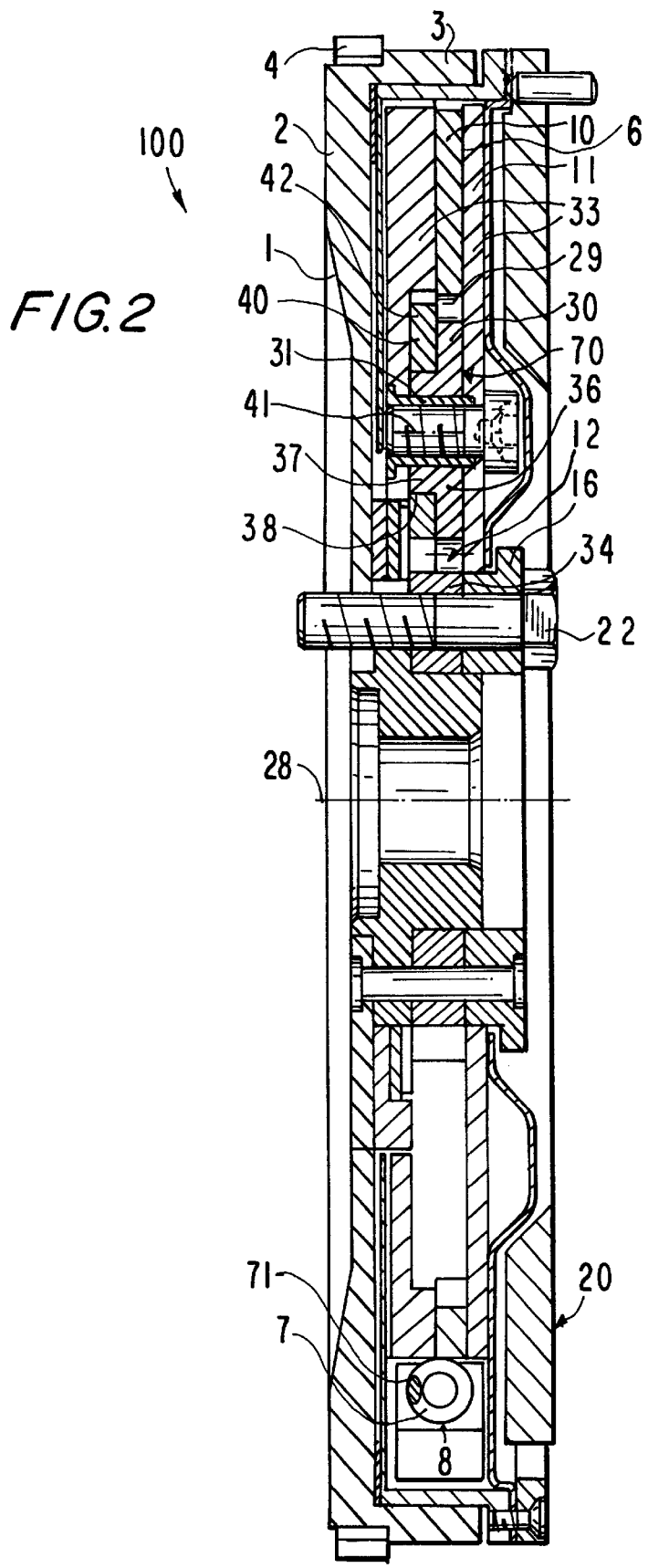
FIG. 2 is a sectional view of another embodiment of the torsional vibration damper.

Another embodiment of a torsional vibration damper 101 is shown in FIG. 2. Compared with the embodiment in FIG. 1, the essential difference of the embodiment of FIG. 2 is that the planetary gear 12 in FIG. 2 is fully exposed to the momentum flow. Torsional vibrations conveyed from the crankshaft 23 (not shown in FIG. 2) via the drive-side transmission element 1 are immediately transmitted to a sun gear 34, which is connected in a rotation-proof fashion to the drive-side transmission element 1, and this to an element of the planetary gear 12. In contrast, in the embodiment of FIG.

1, a partial moment of the moment stemming from the drive-side transmission element 1 is conveyed via the elastic elements 7, bypassing the planetary gear 12, to the hub disk 13 and thus to the output-side transmission element 20.

In the torsional vibration damper 101 shown in FIG. 2, the planetary carriers 33 are rotatably fixed to the output-side transmission element 20 and the internal gear 11 is float mounted axially between the planet carriers 33. Elastic elements 7 are arranged circumferentially between the internal gear 11 and the planet carriers 33 and act as a coupling device 71 of a damping device 8. The total moment conveyed to the sun gear 34 is transmitted to the planetary gearwheel 30. A first partial moment is transmitted from the planetary gearwheel 30 to the planetary carriers 33 and a second partial moment is conveyed to the internal gear 11. This second partial moment is accumulated in the elastic elements 7 and is then recombined with the planetary gears 30. Because the internal gear 11 and the planetary carriers 33 are accommodated on the output-side transmission element 20 and because the inertia of the second partial moment recombines on the planetary gearwheel 30 mounted in this transmission element 20, the two partial moments, after being superimposed on each other, reach the output-side transmission element 20. The individual partial moments may have different orientations and an individual partial moment may be greater that the final total moment delivered on the output-side. The recombination of partial moments, as in the embodiment of a torsional vibration damper 101 in FIG. 2, is referred to as "meshing".

The mass 40 on the planetary gearwheel 30 of the torsional vibration damper 101 corresponds, with respect to effect, to the mass 40 already described in reference to the torsional vibration damper 100 of FIG. 1, so that repeated explanation is unnecessary.

Figure 6:
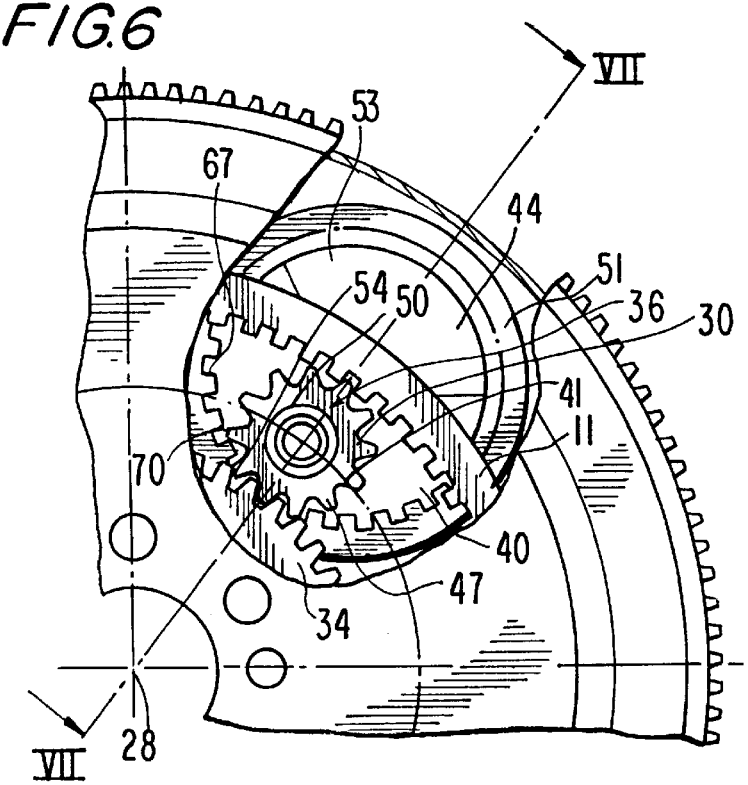
FIG. 6 shows an embodiment of a mass in the form of an internal gear connected via a gear device to the planetary gearwheel.
Figure 7:
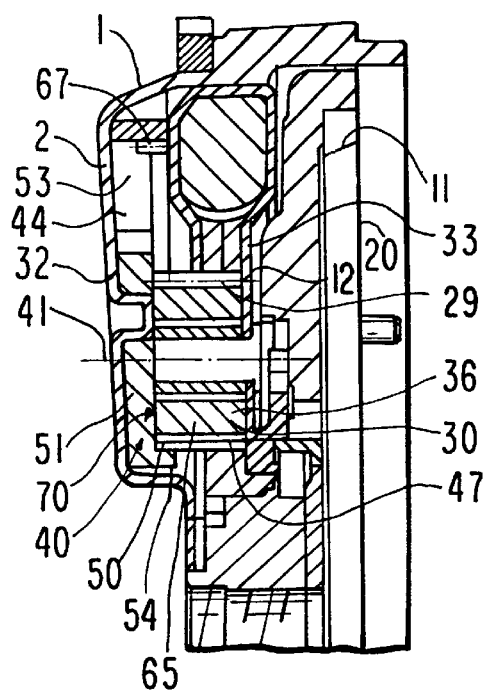
FIG. 7 shows a section through the gear device along line VII—VII in FIG. 6.

In the embodiments described above, to attain an unambiguous association of a particular moment of inertia achieved by the planetary gearwheel 30 with the mass 40 with a particular relative displacement of the transmission elements 1, 20, the rotational angle of the planetary gearwheel 30 is limited to 180°. In contrast, FIGS. 6 and 7 show an embodiment in which such a rotational angle limit is not necessary, because the mass 40 is not directly connected to the planetary gearwheel 30. Instead, the mass 40 acts upon the planetary gearwheel 30 via a gear device 50. A toothing 47 of the planetary gearwheel 30 is embodied, on the side of the toothed engagement 29 with the internal gear 11, with an axial shoulder 65 extending into an inner toothing 67 of an internal toothed gearwheel 51 effective as the mass 40. The internal toothed gearwheel 51 is mounted with respect to the rotational axis 41 of the planetary gearwheel 30, on an axial projection 32 of the primary flange 2 of the drive-side transmission element 1. To ensure the necessary eccentricity, the internal toothed gearwheel 51 has a mass reduction 44 in the form of an opening 53. Upon a relative movement of the transmission elements 1, 20, the planetary gearwheel 30 which is connected to the drive-side transmission element 1 via the planetary carrier 33 is placed into rotation via the sun gear 34 which is connected to the output-side transmission element 20. The planetary gearwheel 30 drives the internal toothed gearwheel 51 via an interlocking gear tooth engagement 54. Since the internal toothed gearwheel 51 has a considerably larger diameter than the planetary gearwheel 30, the rotation of the planetary gearwheel 30 can exceed 360° while the internal toothed gear wheel 51 rotates by only a limited rotational angle and thereby changes the position of its mass reduction 44 relative to the rotational axis 41. The gear device 50, which in this embodiment comprises the toothed engagement 54 between the two toothed gearwheels 30 and 51, should be selected such that the rotational angle of the internal toothed gearwheel 51 is limited to 180°, so as to attain an unambiguous association of the mass reduction 44 with the maximum relative displacement of the transmission elements 1, 20. Because of the large diameter of the internal toothed gearwheel 51, a considerably larger change in the moment of inertia is attainable during the relative displacement of the transmission elements 1, 20 than in the above-described embodiments with the mass 40 directly mounted on the planetary gearwheel 30 as shown in FIGS. 3a–5b.

The embodiment of FIGS. 6 and 7 also includes the damping device 8 (see FIG. 2) arranged between the internal gear 11 and the planetary carrier 33.

Figure 8B:
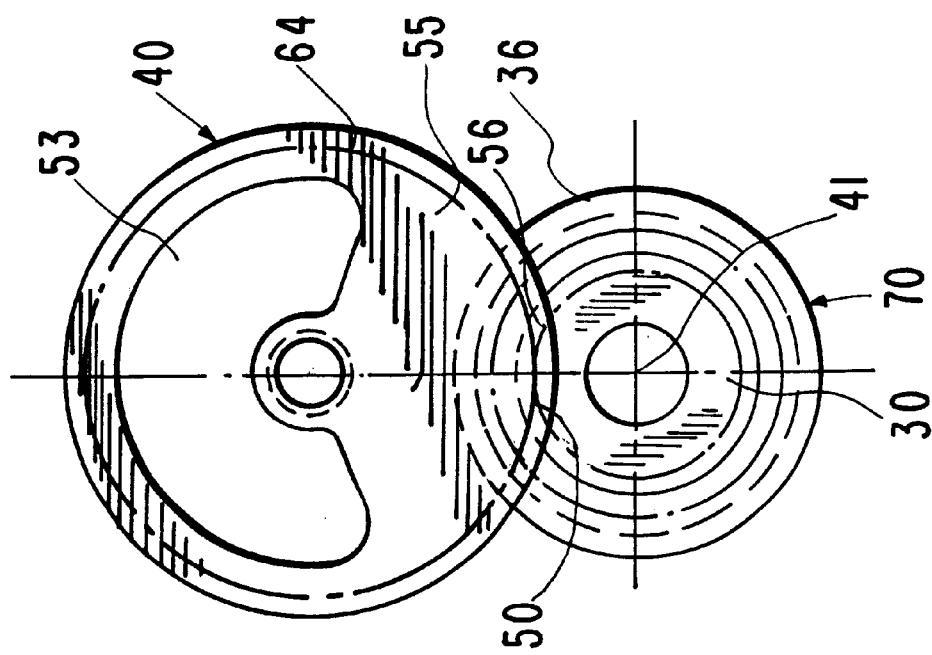
FIGS. 8a and 8b show a simplified mass with external toothing, engaged with the planetary gearwheel.
Figure 8A:
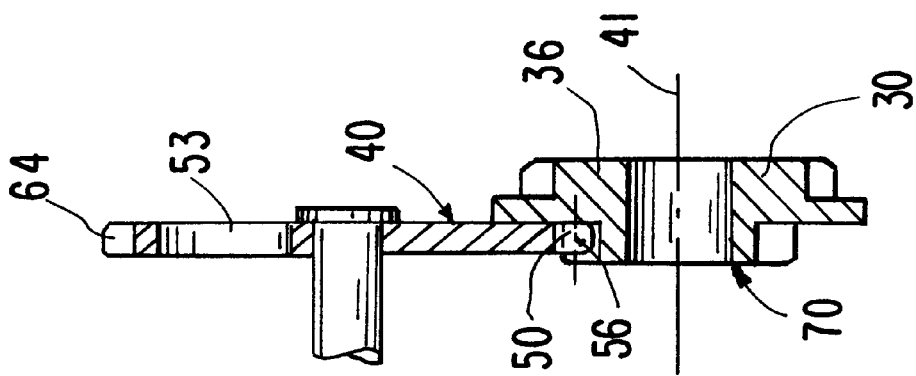

FIG. 8 shown an embodiment similar to that of FIG. 6 in which a toothed gearwheel 55 with external toothing 64 is selected instead of the internal toothed gearwheel 51. The toothed gearwheel 55 forms a toothed engagement 56 with the toothing 47 of the planetary gearwheel 30 and acts as the gear device 50.

Figure 9:
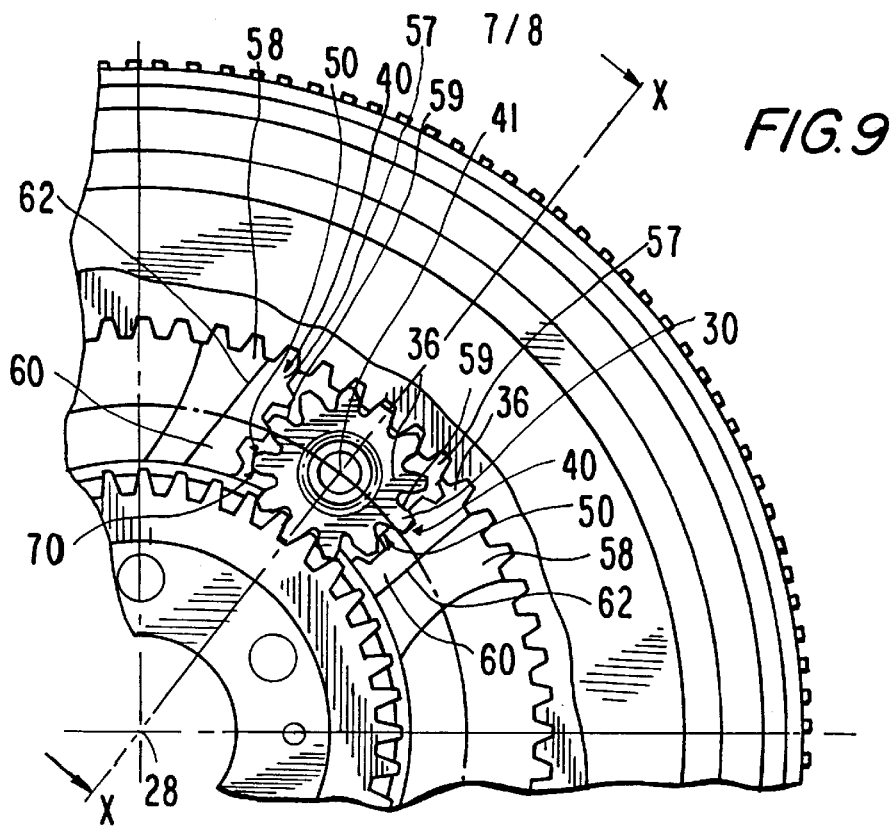
FIG. 9 shows a radially movable mass in the form of a toothed rack on each side of the planetary gearwheel.
Figure 10:
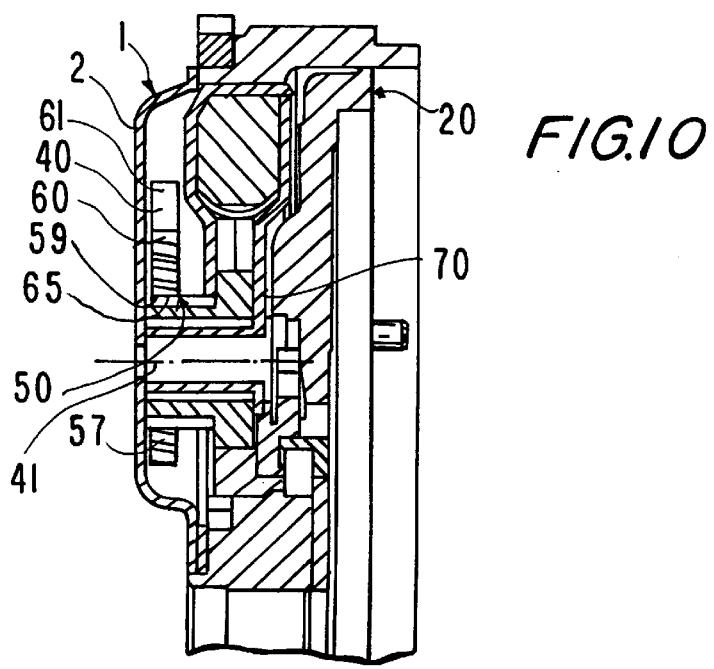
FIG. 10 shows a section of the gear device of FIG. 9 along Section X—X.
Figure 11:
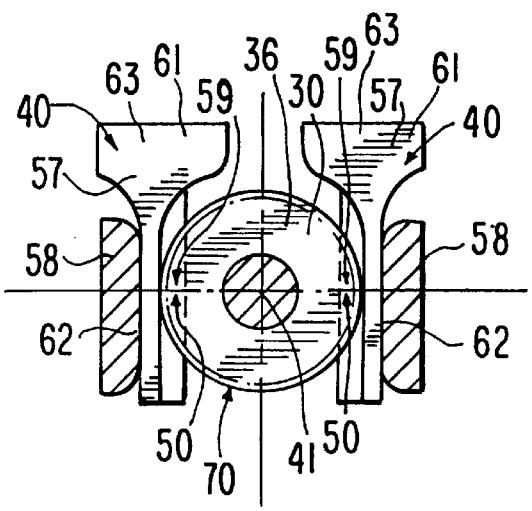
FIG. 11 is a schematic depiction of the toothed rack and planetary gearwheel as in the embodiment shown in FIG. 9.

FIGS. 9 and 10 show an embodiment that basically corresponds to those in FIG. 6 and 7, but in which the internal toothed gearwheel 51 is replaced by toothed racks 57, one of which, seen in the circumferential direction, is arranged between the planetary gearwheel 30 and a radial guide 58. The radial guide 58 permits radial movement of the given toothed rack 57, when driven via its interlocking gear tooth engagement 59 with the planetary gearwheel 30. For this reason, the toothed racks 57 are generally referred to as radially movable gear bodies 60. The interlocking gear tooth engagement 59 thereby forms the gear device 50. For better clarity, FIG. 11 schematically depicts such a device in simplified fashion. This device acts in such a way that, upon a relative movement of the transmission elements 1, 20, the planetary gearwheel 30 is rotated. As a result the right-hand toothed rack 57 in FIG. 11, moves radially inward and the left hand toothed rack 57 moves radially outward. Because the radius of a mass from a rotational axis is quadratically related to the moment of inertia, an increase in the moment of inertia is attained despite the opposed movement of the two toothed racks 57. In this embodiment, given toothed racks 57 of suitable length that preferably carry, in the radially outer area, a mass head 61 as the mass accumulation 63, a rotational angle of more than 360° of the planetary gearwheel 30 is permitted.

Figure 12:
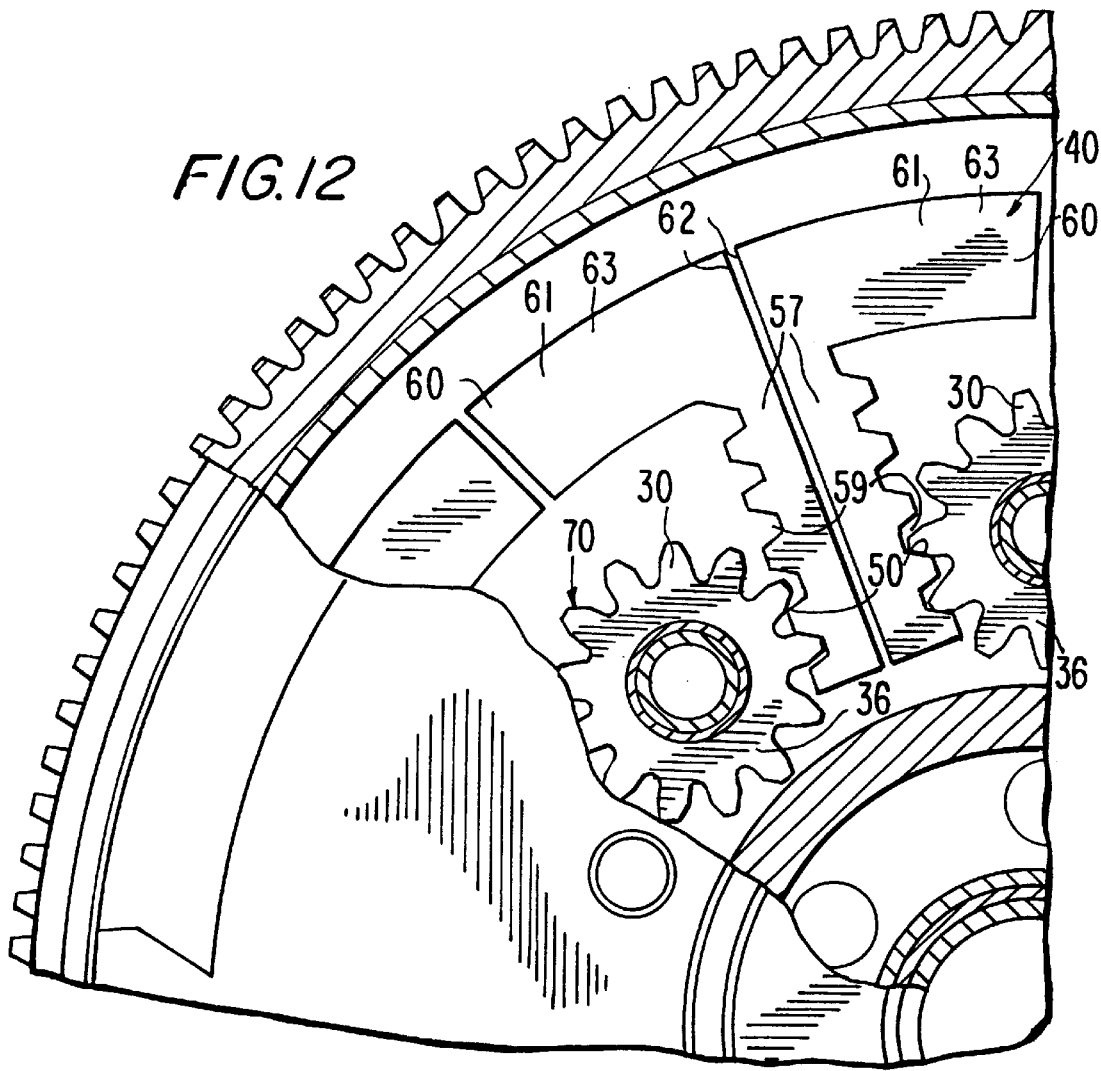
FIG. 12 is an embodiment of the torsional vibration damper like that of FIG. 9, but with a planetary gearwheel associated with each radially movable mass.

In the embodiment shown in FIGS. 9–12, the respective backs of the toothed racks 57 face away from the toothed engagement 59 and face a radial guide 58. In contrast, FIG. 12 shows an embodiment in which the two toothed racks 57 are arranged with their respective backs 62 facing each other. Each of these toothed racks 57 having backs 62 facing each other has its own planetary gearwheel 30. If both planetary gearwheels 30 are in direct active connection with the internal gear 11 (not shown in this drawing), these planetary gearwheels 30 are driven in the same rotational direction. This results in opposing movement of the toothed racks 57, i.e., one toothed rack 57 moves radially inward and the other moves radially outward. When one of the planetary gearwheels 30 is connected to the internal gear 11 via an intermediate gear (not shown) reversing the rotational direction of the planetary gearwheel 30, the planetary gearwheels 30 are driven in the opposite sense, so that the two toothed racks 57 are moved in the same direction radially inward or radially outward. The potential change in the moment of inertia attained in this way is considerable.

Each of the above examples uses a planetary gearwheel 30 as the gear element 36. However, a link gear (as known, for example, from the above-cited DE 42 00 174 A1) may also be used instead of the planetary gearwheels 30 between the two transmission elements 1 and 20. One of these links can be connected via a gear device 50 to a toothed gearwheel, as shown in FIG. 6 in reference to an internal toothed gearwheel 51 and in FIG. 8 in reference to a toothed gearwheel 55. For this purpose, for example, a link or a slider-crank mechanism is conceivable, in which a pivot movement of the link is converted into a rotational movement at the toothed gearwheel 51 or 55.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A torsional vibration damper, comprising:
   a first transmission element rotatably mounted about an axis of rotation;
   a second transmission element rotatably mounted about said axis of rotation such that said second transmission element is rotatable relative to said first transmission element, wherein one of said first and second transmission elements comprises a drive-side transmission element and the other of said first and second transmission elements comprises an output-side transmission element; and
   a coupling connected between said first transmission element and said second transmission element for transmitting a momentum flow from said first transmission element to said second transmission element, said coupling including a first coupling device and a second coupling device,
   said first coupling device including a gear element connected to said second transmission element and a movably mounted mass, said gear element being rotatable in response to a relative movement of said first transmission element and said second transmission element and said movably mounted mass being a separate element from said gear element and connected to said gear element such that said mass is movable relative to said gear element in response to the rotation of said gear element for changing a moment of inertia of said second transmission element, and
   said second coupling device including an internal gear and an elastic element, said internal gear being connected to said gear element, wherein said internal gear is rotatable relative to said second transmission element against an urgency of said elastic element in response to the rotation of said gear element,
   wherein a total moment of inertia transmitted to said coupling from said first transmission element is transmitted to said gear element wherein, a first portion of said total moment is transmitted from the gear element to the second transmission element, and a second portion of said total moment is transmitted from the gear element to said internal gear.

2. The torsional vibration damper of claim 1, wherein said gear element comprises a shoulder drivably connected with said movable mass.

3. The torsional vibration damper of claim 1, wherein said mass comprises a rotatable element having a rotational axis and produces an eccentricity relative to the rotational axis of said mass, said eccentricity comprising a mass accumulation at a predetermined point of said mass, and said gear element comprises a planetary gearwheel of a planetary gear.

4. A torsional vibration damper, comprising:
   a first transmission element rotatably mounted about an axis of rotation;
   a second transmission element rotatably mounted about said axis of rotation such that said second transmission element is rotatable relative to said first transmission element, wherein one of said first and second transmission elements comprises a drive-side transmission element and the other of said first and second transmission elements comprises an output-side transmission element; and
   a coupling connected between said first transmission element and said second transmission element for transmitting a momentum flow from said first transmission element to said second transmission element, said coupling including a first coupling device and a second coupling device,
   said first coupling device including a gear element connected to said second transmission element and a movably mounted mass, said gear element being rotatable in response to a relative movement of said first transmission element and said second transmission element and said movably mounted mass being connected to said gear element such that said mass is movable in response to the rotation of said gear element for changing a moment of inertia of said second transmission element, wherein said gear element comprises a shoulder drivably connected to said mass, wherein said mass comprises a rotatable element having a diameter different from a diameter of said shoulder, and
   said second coupling device including an internal gear and an elastic element, said internal gear being connected to said gear element, wherein said internal gear is rotatable relative to said second transmission element against an urgency of said elastic element in response to the rotation of said gear element,
   wherein a total moment of inertia transmitted to said coupling from said first transmission element is transmitted to said gear element wherein, a first portion of said total moment is transmitted from the gear element to the second transmission element, and a second portion of said total moment is transmitted from the gear element to said internal gear.

5. The torsional vibration damper of claim 4, wherein said shoulder on said gear element is in a interlocking gear tooth engagement with said mass.

6. The torsional vibration damper of claim 5, wherein said gear element comprises a planetary gearwheel of a planetary gear.

7. The torsional vibration damper of claim 4, wherein said mass comprises a gearwheel including a mass reduction and said mass reduction consists of one of a recess at a predetermined point on its outer circumference and a mass accumulation at another predetermined point on its circumference, said gearwheel of said mass comprising an inner diameter for engaging the shoulder on said gear element on at least a portion of the circumference of the gearwheel.

8. The torsional vibration damper of claim 7, wherein said shoulder on said gear element is in a meshed engagement with said mass.

9. The torsional vibration damper of claim 8, wherein said gear element comprises a planetary gearwheel of a planetary gear.

* * * * *